Oct. 4, 1927.  1,644,480
E. G. McDONALD
BRAKE OPERATING MECHANISM
Filed Feb. 25, 1926

SWIVELLING AXIS

SWIVELLING AXIS

INVENTOR
EUGENE G. McDONALD
BY
M. W. McConkey
ATTORNEY

Patented Oct. 4, 1927.

1,644,480

UNITED STATES PATENT OFFICE.

EUGENE G. McDONALD, OF SOUTH BEND, INDIANA, ASSIGNOR TO BENDIX BRAKE COMPANY, OF CHICAGO, ILLINOIS, A CORPORATION OF ILLINOIS.

BRAKE-OPERATING MECHANISM.

Application filed February 25, 1926. Serial No. 90,438.

This invention relates to brakes, and is illustrated as embodied in novel operating mechanism for a brake on a swivelled automobile wheel. An object of the invention is to provide simple operating means for the brake which can shift to balance itself automatically, and which is adapted for use when the space inside the circumference of the brake drum is limited, as is notably the case for example with the brakes on the front wheels of heavy trucks and the like.

Having this object in view, the cam or other shiftable brake-applying means is mounted on a novel movable support, preferably pivoted outside the circumference of the drum, and in the case of a front brake arranged with the axis of the pivot crossing the swivelling axis of the wheel at the top of the brake. An important minor feature of the invention relates to extending the backing plate, which is best flanged to encircle the edge of the drum, as a projecting arm on which the support is pivoted.

When used on a front wheel, I prefer to use a control of the "crank-and-lever" type,—i. e. one including two levers, one swivelling with the wheel and the other fulcrumed on the axle or otherwise in such a manner that its inner end is adjacent the chassis frame, to avoid interference with the swivelling of the wheel, while the outer end moves crosswise of the swivelling axis in applying the brake. If desired, the interengaging parts of the two levers may be arranged for relative movement, when the brake is applied, about a center substantially at the crossing of the swivelling axis and the axis about which the support pivots.

The above and other objects and features of the invention, including various novel combinations of parts and desirable particular constructions, will be apparent from the following description of two illustrative embodiments shown in the accompanying drawing, in which.

Figure 1:
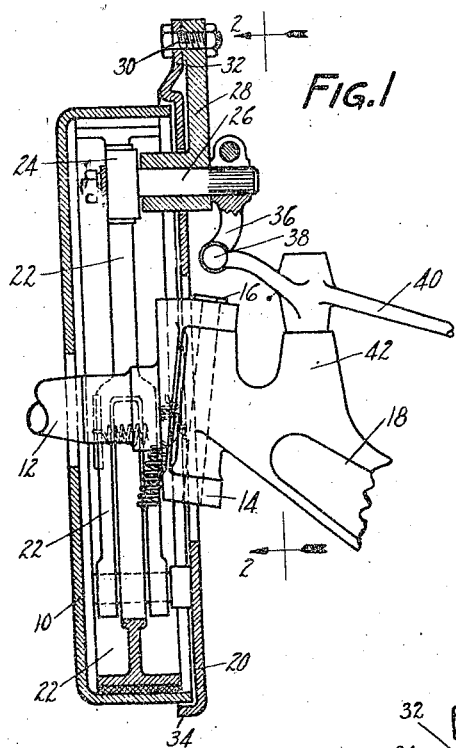
Fig. 1 is a vertical transverse section through one front brake and through associated parts.

The brake of Fig. 1 includes a drum 10 rotating with a wheel (not shown), the wheel being mounted on the spindle 12 of a knuckle 14 swivelled, as by a king pin 16, to the usual front axle 18. The open side of drum 10 is closed by a novel backing plate 20 secured to knuckle 14. Inside of the drum is the friction means of the brake, shown as shoes 22 applied by means such as a cam 24. The particular brake illustrated is substantially as fully described in Patent No. 1,567,716, granted Bendix Brake Company on December 29, 1925, on an application filed by Adiel Y. Dodge, although the invention is equally applicable to a brake of the type disclosed in application No. 80,396, filed January 11, 1926, by Ludger E. La Brie.

According to an important feature of the present invention, cam 24 or its equivalent has a shaft 26 journalled in a support 28 mounted on a pivot 30 connecting it to an arm 32 integral with backing plate 20, and arranged outside the circumference of the brake drum. Plate 20 has a flange 34 encircling the edge of drum 10, arm 32 being integral with this flange but preferably offset back into the plane of the central part of the backing plate. This mounting permits the entire brake-applying device to shift about the axis of pivot 30, to balance itself.

On the end of shaft 26 is adjustably clamped a lever 36, having a flattened end engaged by a ball 38 on the end of a lever 40, shown fulcrumed between its ends on a boss 42 on axle 18. The inner end of lever 40 extends adjacent the chassis frame (not shown), so that it does not interfere with swivelling the wheel, while the outer end moves crosswise of the swivelling axis of the wheel (i. e. the axis of king pin 16 in this instance) in applying the brake, from dotted-line position to full-line position in Fig. 2. When the brake is applied, the center of ball 38 is substantially in the swivelling axis, so that lever 36 rides around it when the wheel is swivelled without affecting the movement of the wheel. If it is desired to relieve the pressure on the brake when the wheel is on the outer side of a turn, the center of ball 38 is arranged when the brake is applied a few hundredths of an inch from the swivelling axis, on the side next the wheel.

Figure 2:
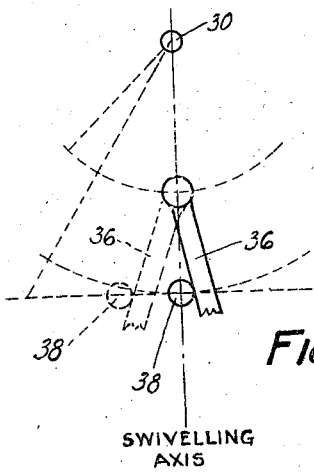
Fig. 2 is a diagram corresponding to a section on the line 2—2 of Fig. 1, and showing the positions of certain parts with respect to the swivelling axis of the wheel.
Figure 4:
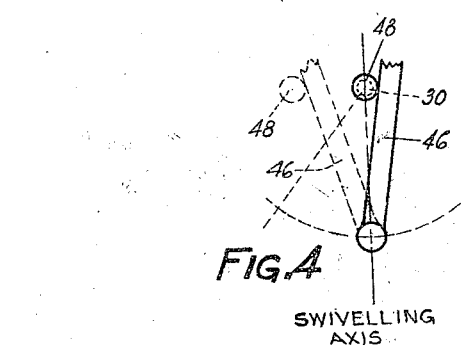
Fig. 4 is a diagram corresponding to Fig. 2, but showing the levers of Fig. 3, and looking in the direction of the arrows 4—4 in Fig. 3.
Figure 3:
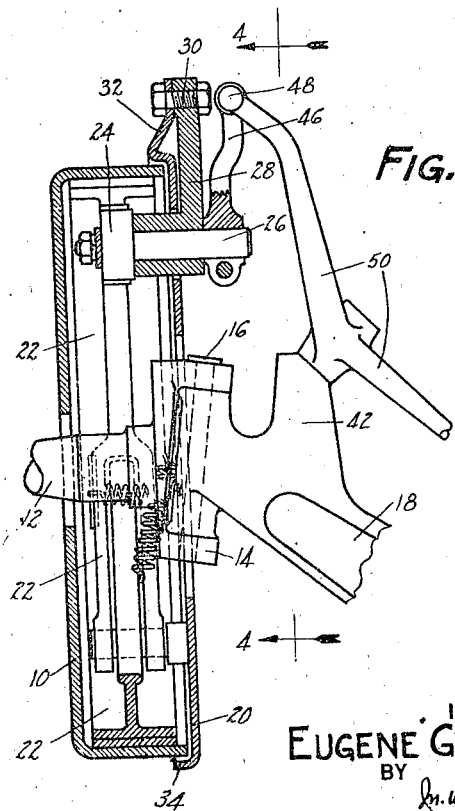
Fig. 3 is a vertical transverse section, corresponding to Fig. 1, but showing a different arrangement of the two levers.

The arrangement of Figs. 3 and 4 differs from that just described in that lever 46, corresponding to lever 36, extends outwardly instead of inwardly, and is engaged by a ball 48 on a lever 50 which is arranged, when the brake is applied, substantially at the crossing of the swivelling axis and the axis of pivot 30. In this arrangement, which is preferred if a very considerable movement of support 28 is anticipated, the shifting of the support does not affect the angular position of lever 46 with respect to the support, and therefore does not affect the brake. Ordinarily the shifting of the support is at most a few hundredths of an inch, and the arrangement of Figs. 1 and 2 is entirely satisfactory.

While two illustrative embodiments have been described in detail, it is not my intention to limit its scope to those particular embodiments, or otherwise than by the terms of the appended claims.

I claim:

1. A brake comprising, in combination, a drum, friction means within the drum having adjacent separable ends, a brake-applying device engaging said ends, and a support for the brake-applying device mounted outside the circumference of the drum and permitting the device to shift when the brake is applied to balance the pressures on said ends.

2. A brake comprising, in combination, a drum, friction means within the drum having adjacent separable ends, a brake-applying device engaging said ends, and means for pivotally supporting the brake-applying device for movement about an axis outside the circumference of the drum.

3. A brake comprising, in combination, a drum, a backing plate having a part outside the circumference of the drum, friction means within the drum, and an applying device for the friction means pivotally supported on said part of the backing plate outside the circumference of the brake drum.

4. A brake comprising, in combination, a drum, a backing plate having a part outside the circumference of the drum, friction means within the drum having adjacent separable ends, an applying device acting on said ends, and a support for the applying device pivoted on said part of the backing plate outside the circumference of the brake drum.

5. A brake comprising, in combination, a drum, a backing plate having a part outside the circumference of the drum, friction means within the drum having adjacent separable ends, a cam acting on said ends, a horizontal shaft for the cam, and a support in which the shaft is journalled pivoted on said part of the backing plate outside the circumference of the brake drum.

6. A brake comprising, in combination, a drum, friction means within the drum having adjacent separable ends, a cam acting on said ends, a horizontal shaft for the cam, and a support in which the shaft is journalled pivotally mounted for movement about an axis outside the circumference of the brake drum.

7. A brake comprising, in combination, a drum, a backing plate for the open side of the drum having a flange encircling the edge of the drum and having a supporting part extending radially outward beyond the flange, friction means engageable with the drum, and an applying device for the friction means supported on said part of the backing plate beyond the flange.

8. A brake backing plate having an edge flange to encircle the edge of a brake drum, and a supporting part integral with said flange and extending radially outward therefrom.

9. A brake backing plate having an edge flange to encircle the edge of a brake drum, and a supporting part integral with said flange and extending radially outward therefrom and offset back substantially into the plane of the central portion of the backing plate.

10. Operating mechanism for a brake on a swivelled wheel including a drum, comprising, in combination, a brake-applying device automatically shiftable to balance itself, and a support for said device pivoted outside the circumference of and above the brake drum substantially in a transverse vertical plane including the swivelling axis of the wheel.

11. Operating mechanism for a brake on a swivelled wheel including a drum, comprising, in combination, a brake-applying device automatically shiftable to balance itself, a support for said device pivoted outside the circumference of and above the brake drum substantially in a transverse vertical plane including the swivelling axis of the wheel, and operating means for said device including parts movable with respect to each other when the brake is applied about a center substantially in said plane.

12. Operating mechanism for a brake on a swivelled wheel including a drum, comprising, in combination, a brake-applying device automatically shiftable to balance itself, a support for said device pivoted outside the circumference of and above the brake drum substantially in a transverse vertical plane including the swivelling axis of the wheel, and operating means for said device including parts movable with respect to each other when the brake is applied about a center substantially in said swivelling axis.

13. Operating mechanism for a brake on a swivelled wheel including a drum, comprising, in combination, a support pivoted outside the circumference of the brake drum and extending within said circumference, brake-applying means carried by the support and including parts within the drum, and a lever operating said means and fulcrummed on the opposite side of the swivelling axis from the wheel and having its outer end movable crosswise of the swivelling axis to a position substantially in said axis and having its inner end spaced a considerable distance inwardly from said axis.

14. Operating mechanism for a brake on a swivelled wheel including a drum, comprising, in combination, a support pivoted outside the circumference of the brake drum and extending within said circumference, brake-applying means carried by the support and including parts within the drum and a vetrical operating arm, and a lever engaging said arm with its outer end and fulcrummed on the opposite side of the swivelling axis from the wheel and having its outer end movable in a direction crosswise of the swivelling axis and having its inner end spaced a considerable distance inwardly from said axis.

15. Operating mechanism for a brake on a swivelled wheel including a drum, comprising, in combination, brake-applying means pivotally supported for movement about an axis outside the circumference of the drum and crossing the swivelling axis of the wheel, and operating connections for said means including parts relatively movable with respect to each other about a center substantially at the crossing of said two axes.

16. Operating mechanism for a brake on a swivelled wheel including a drum, comprising, in combination, brake-applying means pivotally supported for movement about an axis outside the circumference of the drum and crossing the swivelling axis of the wheel, and operating connections for said means including a pair of interengaging levers relatively movable with respect to each other about a center substantially at the crossing of said two axes at least when the brake is applied.

17. Operating mechanism for a brake on a swivelled wheel including a drum, comprising, in combination, brake-applying means pivotally supported for movement about an axis outside the circumference of the drum and crossing the swivelling axis of the wheel, and operating connections for said means including a pair of interengaging levers relatively movable with respect to each other about a center substantially at the crossing of said two axes when the brake is applied, the interengaging parts of the levers being movable in applying the brake in a direction generally perpendicular to both axes.

18. Operating mechanism for a brake on a swivelled wheel comprising, in combination, pivotally-supported brake-applying means mounted to swing about an axis above said means and crossing the swivelling axis of the wheel, and operating connections for said means including a pair of interengaging levers relatively movable with respect to each other when the brake is applied about a center substantially at the crossing of the two axes.

19. Operating mechanism for a brake on a swivelled wheel comprising, in combination, pivotally-supported brake-applying means mounted to swing about an axis above said means and crossing the swivelling axis of the wheel, and operating connections for said means including a pair of interengaging levers relatively movable with respect to each other when the brake is applied about a center substantially at the crossing of the two axes, the interengaging parts of the levers being movable in applying the brake in a direction generally perpendicular to both axes.

20. Operating mechanism for a brake on a swivelled wheel comprising, in combination, pivotally-supported brake-applying means mounted to swing about an axis above said means and crossing the swivelling axis of the wheel, and operating connections for said means including a pair of interengaging levers one of which has a ball at its end engaging the other, the center of the ball being arranged when the brake is applied substantially at the crossing of the two axes.

21. Operating mechanism for a brake on a swivelled wheel comprising, in combination, pivotally-supported brake-applying means mounted to swing about an axis above said means and crossing the swivelling axis of the wheel, and operating connections for said means including a pair of interengaging levers one of which has a ball at its end engaging the other, the center of the ball being arranged when the brake is applied substantially at the crossing of the two axes, said ball being movable in applying the brake in a direction substantially perpendicular to both axes.

In testimony whereof, I have hereunto signed my name.

EUGENE G. McDONALD.